Feb. 13, 1923.
H. W. BUCKMAN
HYDRAULIC VALVE MECHANISM
Filed Jan. 22, 1921
1,445,127
5 sheets-sheet 2
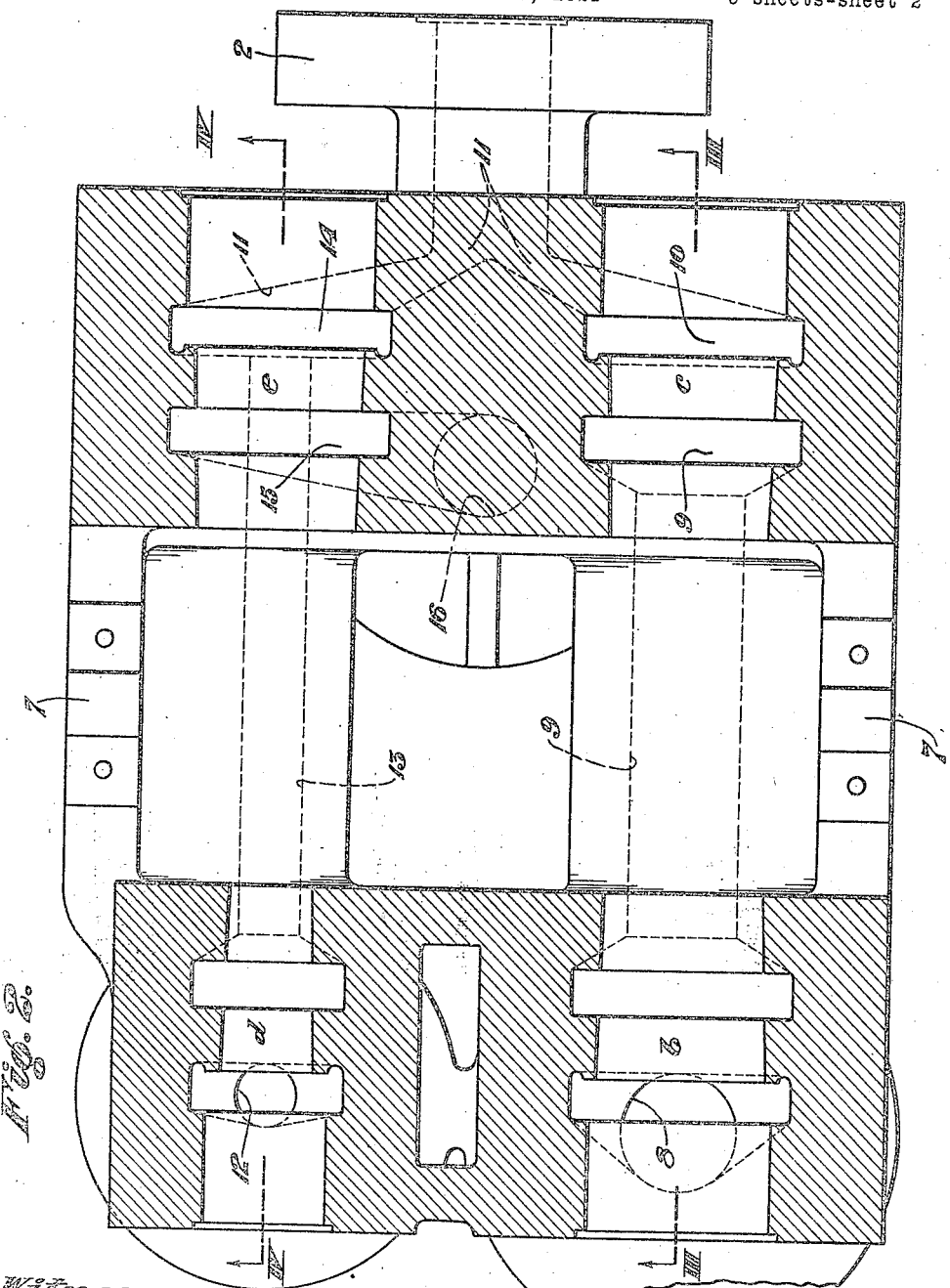

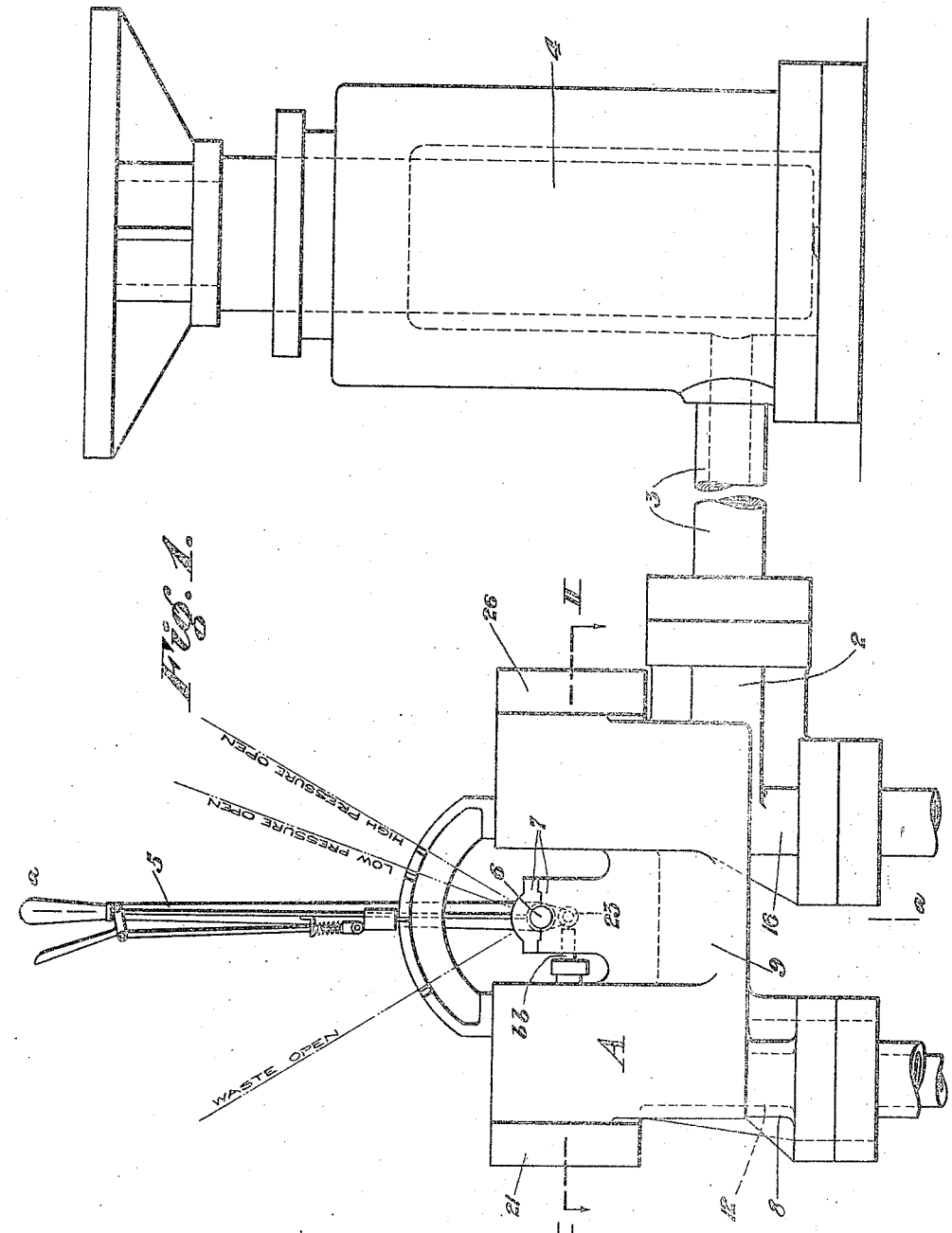

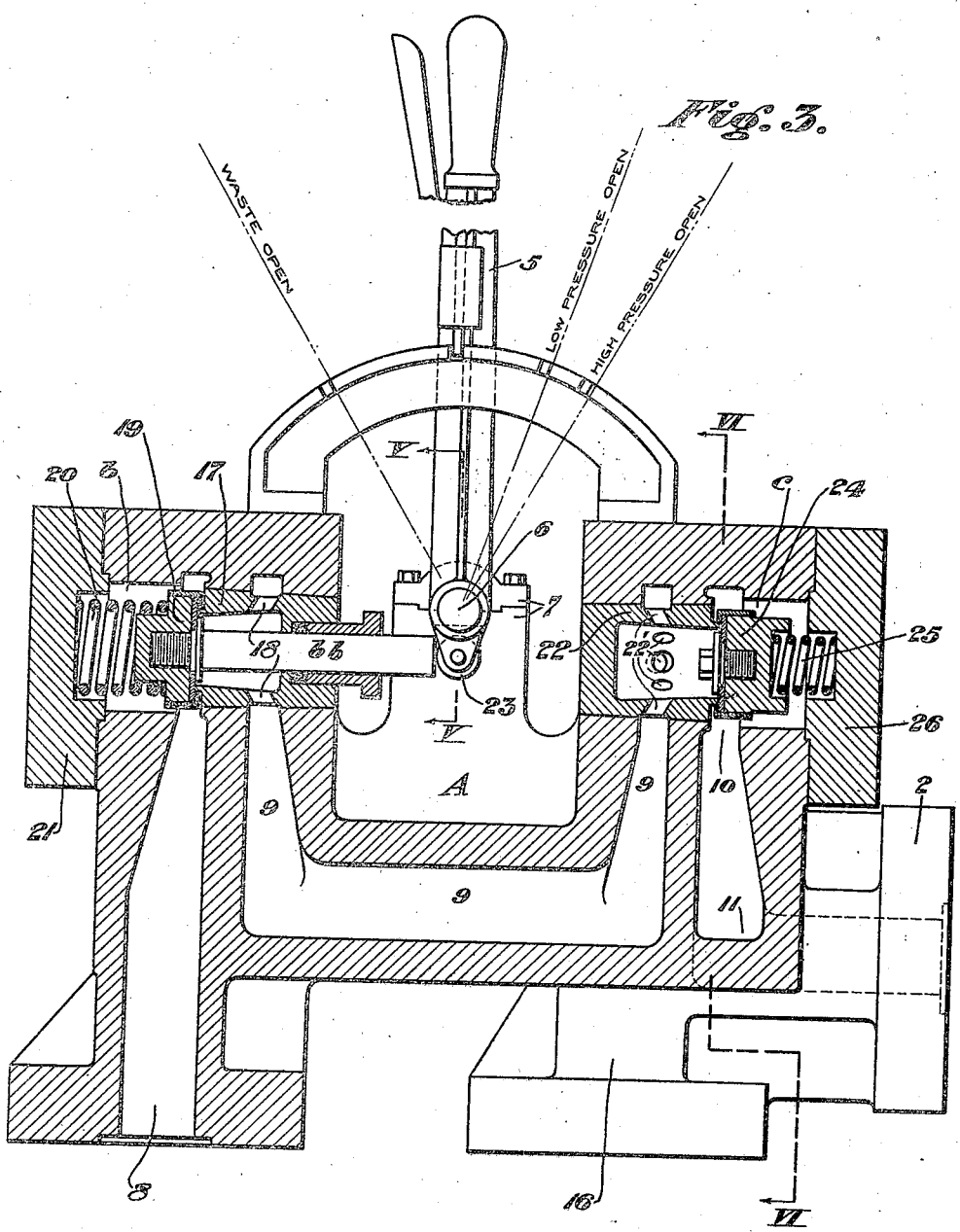

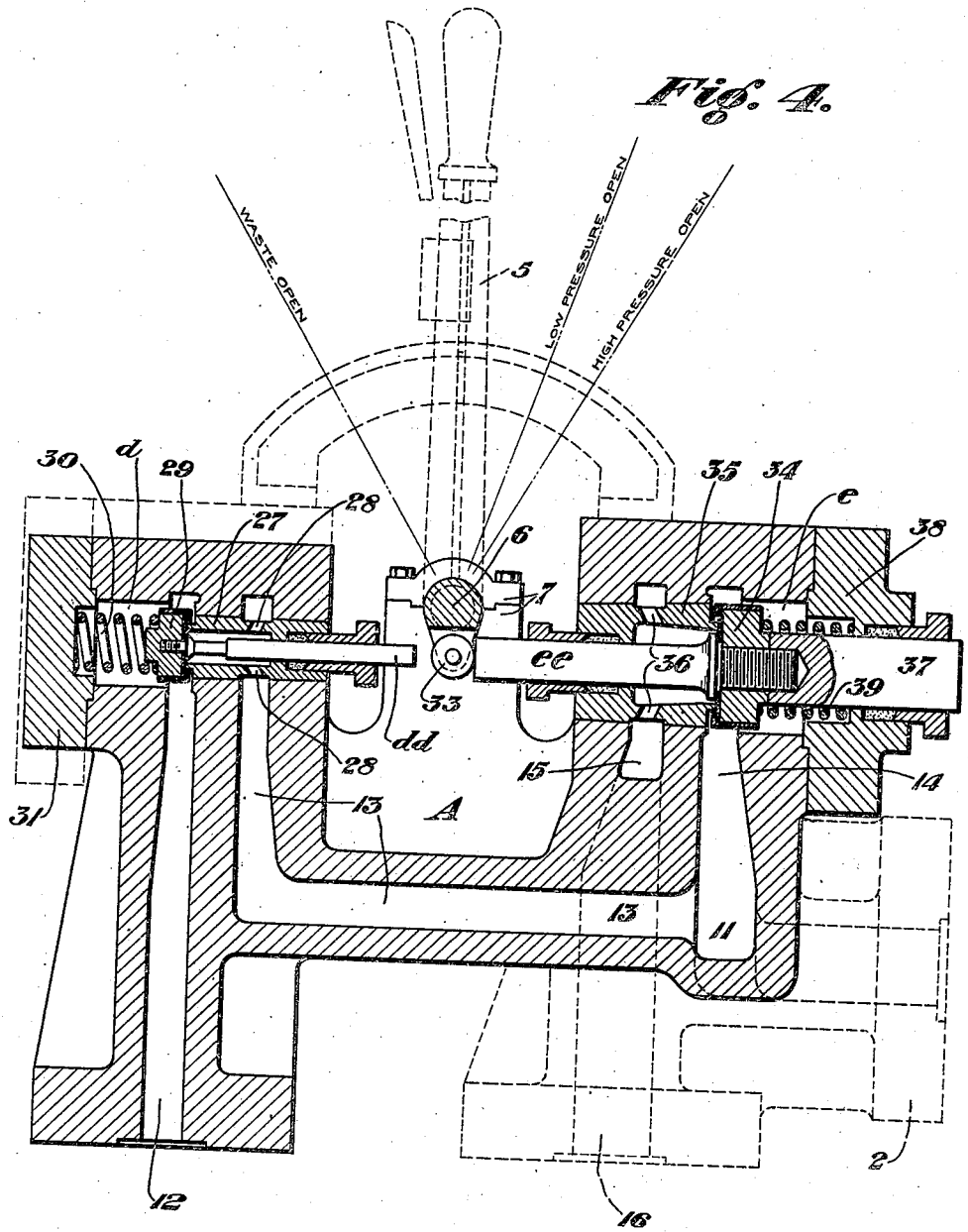

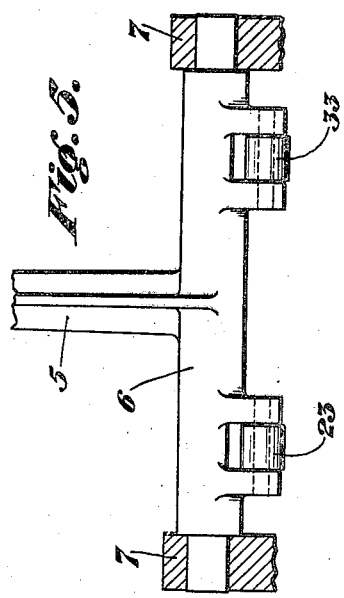
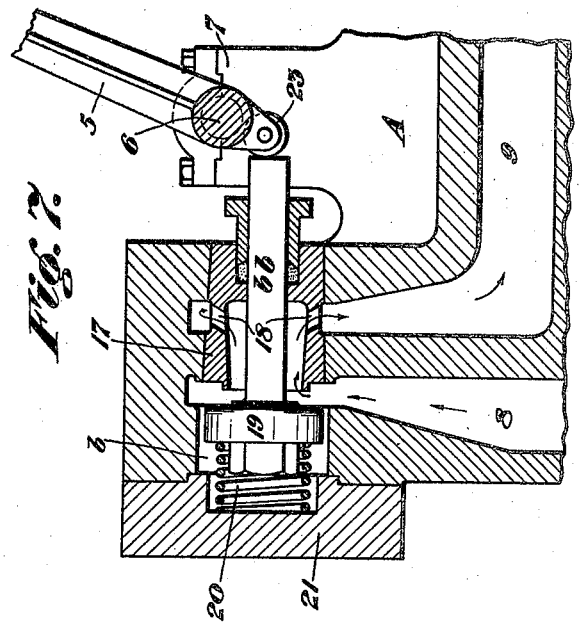
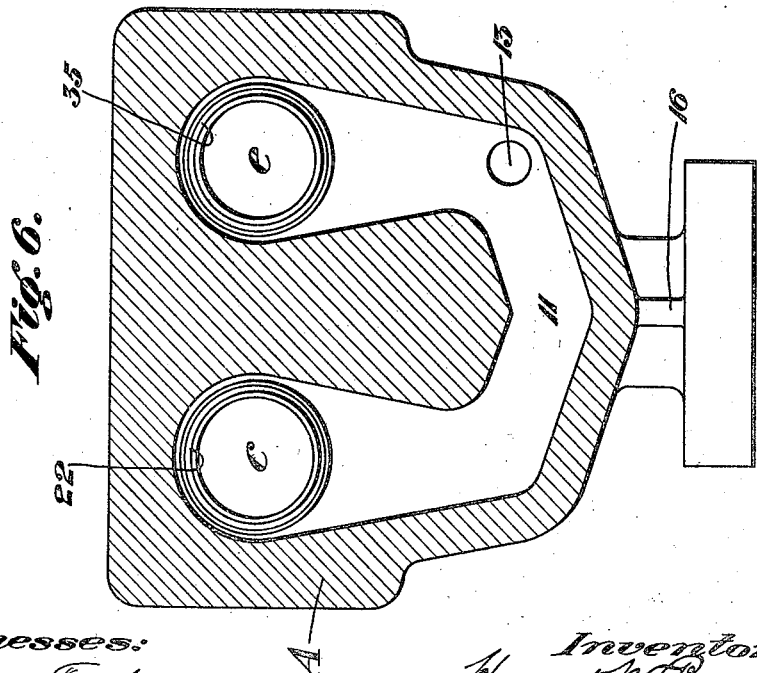

Patented Feb. 13, 1923.

1,445,127

UNITED STATES PATENT OFFICE.

HAROLD W. BUCKMAN, OF PITTSBURGH, PENNSYLVANIA, ASSIGNOR TO VANCE ENGINEERING COMPANY, OF PITTSBURGH, PENNSYLVANIA, A CORPORATION OF PENNSYLVANIA.

HYDRAULIC-VALVE MECHANISM.

Application filed January 22, 1921. Serial No. 439,234.

*To all whom it may concern:*

Be it known that I, HAROLD W. BUCKMAN, a citizen of the United States, residing at Pittsburgh, in the county of Allegheny and State of Pennsylvania, have invented certain new and useful Improvements in Hydraulic-Valve Mechanism, of which the following is a specification.

My invention consists of an improvement in hydraulic valves for controlling the flow of liquids under pressure in connection with fluid actuated mechanism. It has in view to provide a construction capable of controlling the pressure and exhaust flow to and from the utilizing device, such as a motor or the like, utilizing a reciprocating plunger so that variable pressures may be utilized, by the operation of a single controlling lever, in connection with cooperating valves and circulating ports, in the manner hereinafter described.

One of the principal objects of the invention is to provide means whereby the main or principal work of merely moving the active element of the motor may be done by the use of a comparatively low pressure head of fluid until it is adjusted to the position requiring heavy pressure, and to then supply such increased pressure during a minimum time or extent of action, with provision for exhaust after each operation.

The valve as a whole comprises a casing having at one side of its transverse middle portion a low pressure inlet port and valve, and a high pressure inlet port and valve, a circulating port from the low pressure valve through a check valve to a common supply port, a circulating port from the high pressure port directly to the common supply and exhaust port, a waste port communicating with the common supply port and a waste controlling valve, and an operating lever or handle adapted to first open the low pressure valve and then, while retaining it open and with its circulating port checked against back flow, by further movement of the lever to open the high pressure valve for increased pressure, and finally by reverse movement of the lever to open the waste valve for release of the fluid from the motor.

In the drawings, which show one preferred form of the invention,

Fig. 1 is a general view in elevation, showing the invention as applied to the hydraulic ram or plunger of a press;

Fig. 2 is a longitudinal horizontal section through the valve casing with the valves removed in order to show the circulating ports, etc., taken on the line II—II of Fig. 1;

Fig. 3 is a longitudinal vertical section through the low pressure circulating ports, supply valve, and check valve, on the line III—III of Fig. 2;

Fig. 4 is a similar view on the line IV—IV of Fig. 2;

Fig. 5 is a detail view on the line V—V of Fig. 3, showing the lever actuated rock shaft and its valve stem engaging rollers;

Fig. 6 is a transverse vertical section on the line VI—VI of Fig. 3; and

Fig. 7 is a sectional detail view showing one of the valves open.

In the drawings, A represents generally the entire valve mechanism enclosed within a preferably single casting, having the necessary closure heads, bearings, and other attachments hereinafter described, and a terminal connection 2 for a supply and return pipe 3 leading to the base of a hydraulic plunger cylinder 4, or other element, to be supplied with the operative fluid.

Valve casing A, as shown, is generally arranged to provide at one side of its transverse middle portion $a$—$a$ a low pressure and a high pressure valve respectively, and at the other side of such middle portion a check valve providing for admission of low pressure and prevention of return flow, and also with a positively actuated waste valve. The latter valve and the low pressure and high pressure valve respectively are arranged for positive operation by the controlling lever 5 of a trunnioned rock shaft 6, mounted in bearings 7—7 at each side portion of the casing.

As shown in Fig. 2, in which the several valves are omitted, the low pressure circulation from a suitable low pressure inlet supply 8 communicates through a valve chamber $b$ with a low pressure supply port 9, which in turn communicates with a check valve chamber $c$ which is in direct communication by port 10 with a common supply and exhaust chamber 11 leading through connection 2 to the cylinder of the motor to be actuated.

The several valve chambers $b$, $c$, and ports 8, 9 and 10 are in general longitudinal alinement at one side of the longitudinal center of the valve structure, as indicated by the section line III—III of Fig. 2.

On the other side of the longitudinal center line, and on the vertical plane of the section line IV—IV of said figure, are arranged a high pressure valve chamber $d$ in communication by port 12 with a high pressure supply line and the high pressure valve chamber communicates by port 13 directly with the common supply and exhaust chamber 11 and head 2 and pipe 3 leading to the cylinder 4.

In the same longitudinal vertical plane, at the other side of the transverse middle portion $a$—$a$, is the valve chamber $e$ for the positively actuated waste valve which controls the return flow of waste water from chamber 11 through ports 14 and 15 to the waste connection 16. As shown, each of the several valve chambers $b$, $d$, and $e$ are provided with positively actuated valves, while chamber $c$ is provided with an automatically operable check valve, the purpose of which is to open under pressure of the low pressure stream toward the motor and to seat against return flow, and especially under the increased pressure of the high pressure supply, when applied, to prevent communication backwardly thereof through the low pressure ports and valve.

In low pressure chamber $b$ is mounted a hollow bushing 17 having annular ports 18 communicating with supply port 9 and having a controlling valve 19 seating against the end of the hollow bushing, whereby to open or close communication between ports 8 and 9. Valve 19 is normally seated by a spring 20 between the valve and a closing head 21, and is provided with a stem $bb$ extending inwardly through a suitable stuffing box within range of the roller 23 of the lever actuated rock shaft 6, as shown in Fig. 3.

In check valve chamber $c$ is a similar bushing 22 having annular ports 22' communicating with supply port 9 and having at its open end a check valve 24, normally seated thereagainst by spring 25 between the valve and head 26. By this construction, low pressure fluid may pass from port 9 through ports 22' of the bushing against the check valve to port 10 and chamber 11 to operate the plunger of cylinder 4 by low pressure, to lift it through the range of its movement before requiring the necessary additional pressure to perform its intended work.

In high pressure chamber $d$, at the other side, is mounted a bushing 27 similar to bushing 17, having annular ports 28 communicating with supply port 13, and a valve 29 similar to valve 19 seats against the end of the bushing by action of spring 30, between valve 29 and closing head 31. Valve 29 is provided with a stem $dd$ extending inwardly through a suitable stuffing box within the range of its operating roller 33 of the rock shaft 6. As shown, the stem $bb$ of low pressure valve 19 is in position for immediate engagement by roller 23 when the lever 5 is thrown to the low pressure open position, while stem $dd$ of the high pressure valve 29 terminates a slight distance beyond roller 33, in its middle position, so that it will not be engaged until the low pressure valve has been opened and lever 5 is thrown further over to the high pressure open position.

By this construction, it will be seen that the low pressure valve may be first opened by a definite movement of the lever, and that further movement of the lever will then open the high pressure valve, continuing the opening but inoperative movement of the low pressure valve. In each case, the circulation is first by low pressure port 8, through valve chamber $b$, port 9, check valve chamber $c$, and port 10 and chamber 11 to the cylinder 4, as to low pressure, and by high pressure port 12, high pressure chamber $d$, port 13, and chamber 11 directly to the cylinder, for high pressure. As stated, the check valve 24 seals against return flow of high pressure backwardly of its seat.

The operation of supplying first low pressure and then high pressure to cylinder 4 having been accomplished, and in order to exhaust therefrom, this is effected by positive actuation of exhaust valve 34 seating against the end of a bushing 35 in chamber $e$ provided with annular ports 36 communicating with port 15 and waste outlet 16. Exhaust valve 34 is provided with a stem 37 extending through head 38 and suitable packing mechanism therein, and is also provided with a seating spring 39 and an operating stem $ee$. The latter, like stem $bb$, terminates at the periphery of roller 33 of rock shaft 6 in its normal middle position, so that when lever 5 is thrown in the opposite direction over to the waste open position, stem $ee$ and valve 34 will be actuated, opening communication through ports 14 and 15 to the waste, as will be readily understood.

The construction and operation of the invention will be readily appreciated from the foregoing description. It provides a very simple, strong, and compact construction, enabling the operator to utilize a low pressure head, as say 350 pounds, by direct application for preliminary movements against low resistance, and for various distances of travel, and by a slight further movement of the lever to supply the greatly increased high pressure head, as say 2000 pounds. At the same time, the fluid first supplied under low pressure is trapped by the check valve, so that a minimum amount only of high pressure is necessary to accomplish the additional heavy work of pressing or the like, under the strain of resisting pressure. The valve is therefore very economical in use of high pressure fluid, and reduces the cost of the high pressure supply to a minimum as to the pumping or storage installation, its fuel expense, etc.

What I claim is:

1. A unitary compound pressure hydraulic valve provided with a low pressure valve and a check valve at one side and a high pressure valve at the other side, and a single member for actuating said valves.

2. A unitary compound pressure hydraulic valve provided with a low pressure valve and a check valve at one side and a high pressure valve at the other side, a release valve, and a single member for actuating said valves.

3. A compound pressure hydraulic valve provided with a low pressure valve and a check valve and circulating ports for pressure application, a high pressure valve and a release valve and circulating ports for pressure application, and a single actuating element for actuating the low pressure, high pressure, and release valves respectively.

4. A compound pressure hydraulic valve provided with a low pressure valve and a check valve at one side and a high pressure valve and a release valve at the other side, and a single operating lever having portions adapted to actuate the low pressure, high pressure, and release valves respectively.

5. A compound pressure hydraulic valve provided with a low pressure valve and a check valve at one side and a high pressure valve and a release valve at the other side, a single operating lever having a rock shaft and pressure rollers adapted to first operate the low pressure valve and while holding it open to then actuate the high pressure valve, and by reverse movement to actuate the release valve.

6. In compound valve mechanism, a casing having a low pressure conduit communicating with a supply and exhaust chamber with an intervening control valve and a check valve; a high pressure conduit within said casing communicating with the supply and exhaust chamber with an intervening control valve; and an exhaust conduit within said casing communicating with the supply and exhaust chamber with an intervening control valve.

7. In compound valve mechanism, a casing having a low pressure conduit communicating with a supply and exhaust chamber with an intervening control valve and a check valve; a high pressure conduit within said casing communicating with the supply and exhaust chamber with an intervening control valve; an exhaust conduit within said casing communicating with the supply and exhaust chamber with an intervening control valve, and means for actuating the several control valves.

8. In compound valve mechanism, a casing having a low pressure conduit communicating with a supply and exhaust chamber with an intervening control valve and a check valve; a high pressure conduit with said casing communicating with the supply and exhaust chamber with an intervening control valve, an exhaust conduit within said casing communicating with the supply and exhaust chamber with an intervening control valve, and unitary means for actuating the low pressure control valve, the high pressure control valve, and the exhaust control valve respectively.

9. In compound valve mechanism, a casing having a low pressure conduit communicating with a supply and exhaust chamber with an intervening control valve and a check valve; a high pressure conduit within said casing communicating with the supply and exhaust chamber with an intervening control valve, and exhaust conduit within said casing communicating with the supply and exhaust chamber with an intervening control valve, and unitary means for first actuating the low pressure control valve, then while holding the low pressure valve open, means for actuating the high pressure valve, and for actuating the exhaust valve.

10. In compound valve mechanism, a casing having a low pressure conduit communicating with a supply and exhaust chamber with an intervening control valve and a check valve; a high pressure conduit communicating with the supply and exhaust chamber with an intervening control valve, an exhaust conduit communicating with the supply and exhaust chamber with an intervening control valve, and a lever and rock shaft provided with bearing portions adapted to actuate the low pressure valve, the high pressure valve, and the exhaust valve respectively.

11. In combination, a casing provided with a supply and return chamber and connection, a low pressure conduit communicating with said chamber and having a control valve and a check valve, a high pressure conduit communicating with said chamber and having a control valve, an exhaust conduit communicating with said chamber and having a control valve, and a lever and rock shaft provided with bearing rollers, one for the low pressure valve and one for the high pressure valve and exhaust valve respectively.

12. In combination, a casing having a supply and return conduit and connection, a valve controlled high pressure conduit and a valve controlled exhaust conduit respectively communicating therewith, a low pressure conduit also communicating therewith provided with a control valve and an inwardly opening check valve between the control valve and the supply and return conduit, and a single lever and rock shaft provided with bearing portions adapted to actuate the low pressure valve, the high pressure valve, and the exhaust valve respectively.

In testimony whereof I hereunto affix my signature.

HAROLD W. BUCKMAN.